(12) United States Patent
Steinman et al.

(10) Patent No.: US 8,924,758 B2
(45) Date of Patent: Dec. 30, 2014

(54) METHOD FOR SOC PERFORMANCE AND POWER OPTIMIZATION

(75) Inventors: Maurice B. Steinman, Marlborough, MA (US); Alexander J. Branover, Chestnut Hill, MA (US); Guhan Krishnan, Chelmsford, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 355 days.

(21) Appl. No.: 13/360,012

(22) Filed: Jan. 27, 2012

(65) Prior Publication Data

US 2013/0151869 A1 Jun. 13, 2013

Related U.S. Application Data

(60) Provisional application No. 61/570,089, filed on Dec. 13, 2011.

(51) Int. Cl.
*G06F 1/32* (2006.01)

(52) U.S. Cl.
CPC ............ *G06F 1/3243* (2013.01); *G06F 1/3275* (2013.01)
USPC .......................................... 713/323; 713/320

(58) Field of Classification Search
CPC .... G06F 1/3206; G06F 1/3243; G06F 1/3275
USPC ................................................ 713/320, 323
See application file for complete search history.

(56) References Cited

U.S. PATENT DOCUMENTS

| | | |
|---|---|---|
| 4,237,535 A | 12/1980 | Wiedenman |
| 4,980,836 A | 12/1990 | Carter et al. |
| 5,396,635 A | 3/1995 | Fung |
| 5,490,059 A | 2/1996 | Mahalingaiah et al. |
| 5,617,572 A | 4/1997 | Pearce et al. |
| 5,692,202 A | 11/1997 | Kardach et al. |

(Continued)

FOREIGN PATENT DOCUMENTS

| | | |
|---|---|---|
| EP | 2375305 | 10/2011 |
| GB | 2395309 | 5/2004 |

OTHER PUBLICATIONS

International Search Report in related Application No. PCT/US2012/069173, Aug. 7, 2013, pp. 1-9.

(Continued)

*Primary Examiner* — Albert Wang
(74) *Attorney, Agent, or Firm* — Rory D. Rankin; Meyertons, Hood, Kivlin, Kowert & Goetzel, P.C.

(57) ABSTRACT

A system and method for efficient management of resources within a semiconductor chip for an optimal combination of power reduction and high performance. An intergrated circuit, such as a system on a chip (SOC), includes at least two processing units. The second processing unit includes a cache. The SOC includes a power management unit (PMU) that determines whether a first activity level for the first processing unit is above a first threshold and a second activity level for the second processing unit is below a second threshold. If this condition is true, then the PMU places a limit on a highest power-performance state (P-state) used by the second processing unit. The PMU sends an indication to flush the at least one cache within the second processing unit. The PMU changes a P-state used by the first processing unit to a higher performance P-state.

17 Claims, 6 Drawing Sheets

(56) References Cited

U.S. PATENT DOCUMENTS

| | | |
|---|---|---|
| 5,712,826 A | 1/1998 | Wong et al. |
| 5,740,417 A | 4/1998 | Kennedy et al. |
| 5,764,089 A | 6/1998 | Partovi et al. |
| 5,774,704 A | 6/1998 | Williams |
| 5,815,693 A | 9/1998 | Mcdermott et al. |
| 5,917,355 A | 6/1999 | Klass |
| 6,055,640 A | 4/2000 | Kageshima et al. |
| 6,278,308 B1 | 8/2001 | Partovi et al. |
| 6,334,167 B1 | 12/2001 | Gerchman et al. |
| 6,457,135 B1 | 9/2002 | Cooper |
| 6,473,732 B1 | 10/2002 | Chen |
| 6,510,525 B1 | 1/2003 | Nookala |
| 6,553,501 B1 | 4/2003 | Yokoe |
| 6,597,620 B1 | 7/2003 | McMinn |
| 6,611,435 B2 | 8/2003 | Kumar et al. |
| 6,636,977 B1 | 10/2003 | Chen |
| 6,657,634 B1 | 12/2003 | Sinclair et al. |
| 6,820,209 B1 | 11/2004 | Culbert et al. |
| 6,836,849 B2 | 12/2004 | Brock et al. |
| 6,898,718 B2 | 5/2005 | Morrow |
| 6,954,864 B2 | 10/2005 | Schelling |
| 6,988,214 B1 | 1/2006 | Verdun |
| 7,010,708 B2 | 3/2006 | Ma |
| 7,085,941 B2 | 8/2006 | Li |
| 7,089,437 B2 | 8/2006 | Swoboda |
| 7,111,179 B1 | 9/2006 | Girson et al. |
| 7,152,169 B2 | 12/2006 | Cooper et al. |
| 7,159,766 B2 | 1/2007 | Wurzburg et al. |
| 7,200,762 B2 | 4/2007 | Pearl |
| 7,254,721 B1 | 8/2007 | Tobias et al. |
| 7,301,373 B1 | 11/2007 | Bailey et al. |
| 7,409,568 B2 | 8/2008 | Tam et al. |
| 7,420,378 B2 | 9/2008 | Audet et al. |
| 7,426,320 B2 | 9/2008 | Stevens |
| 7,428,644 B2 | 9/2008 | Jeddeloh et al. |
| 7,437,581 B2 | 10/2008 | Grochowski et al. |
| 7,454,637 B2 | 11/2008 | Er et al. |
| 7,464,276 B2 | 12/2008 | Rusu et al. |
| 7,490,254 B2 * | 2/2009 | Clark ........................... 713/320 |
| 7,496,777 B2 | 2/2009 | Kapil |
| 7,498,694 B2 | 3/2009 | Luo et al. |
| 7,502,948 B2 | 3/2009 | Rotem et al. |
| 7,565,562 B2 | 7/2009 | Chary |
| 7,596,709 B2 | 9/2009 | Cooper et al. |
| 7,613,934 B2 | 11/2009 | Hou et al. |
| 7,617,406 B2 | 11/2009 | Yasuo |
| 7,664,971 B2 | 2/2010 | Oh |
| 7,702,938 B2 | 4/2010 | Ha |
| 7,743,267 B2 | 6/2010 | Snyder et al. |
| 7,800,621 B2 | 9/2010 | Fry |
| 7,802,060 B2 | 9/2010 | Hildebrand |
| 7,818,596 B2 | 10/2010 | Fenger et al. |
| 7,840,827 B2 | 11/2010 | Dahan et al. |
| 7,861,068 B2 | 12/2010 | Gorbatov et al. |
| 7,868,479 B2 | 1/2011 | Subramaniam |
| 7,873,850 B2 | 1/2011 | Cepulis et al. |
| 7,899,990 B2 | 3/2011 | Moll et al. |
| 7,917,787 B2 | 3/2011 | Jahagirdar et al. |
| 7,966,506 B2 | 6/2011 | Bodas et al. |
| 7,966,511 B2 | 6/2011 | Naveh et al. |
| 7,979,699 B2 | 7/2011 | Buch et al. |
| 8,010,822 B2 | 8/2011 | Marshall et al. |
| 8,064,197 B2 | 11/2011 | Mowry et al. |
| 8,069,359 B2 | 11/2011 | Tolentino |
| 8,108,703 B2 | 1/2012 | Bahali et al. |
| 8,145,927 B2 | 3/2012 | Okitsu et al. |
| 8,181,046 B2 | 5/2012 | Marcu et al. |
| 2001/0011356 A1 | 8/2001 | Lee et al. |
| 2002/0087896 A1 | 7/2002 | Cline et al. |
| 2003/0110012 A1 | 6/2003 | Orenstien et al. |
| 2003/0120961 A1 | 6/2003 | Cooper |
| 2003/0149904 A1 | 8/2003 | Kim |
| 2005/0044429 A1 | 2/2005 | Gaskins et al. |
| 2005/0050373 A1 | 3/2005 | Orenstien et al. |
| 2005/0080967 A1 | 4/2005 | Ries et al. |
| 2006/0004538 A1 | 1/2006 | Cancel |
| 2006/0090161 A1 | 4/2006 | Bodas et al. |
| 2006/0112286 A1 | 5/2006 | Whalley et al. |
| 2006/0149975 A1 | 7/2006 | Rotem et al. |
| 2006/0174142 A1 | 8/2006 | Lin et al. |
| 2006/0187226 A1 | 8/2006 | Bruno et al. |
| 2006/0236140 A1 | 10/2006 | Tanaka |
| 2006/0248356 A1 | 11/2006 | Won et al. |
| 2006/0253715 A1 | 11/2006 | Ghiasi et al. |
| 2006/0259793 A1 | 11/2006 | Moore et al. |
| 2006/0282692 A1 | 12/2006 | Oh |
| 2006/0288243 A1 | 12/2006 | Kim |
| 2007/0061603 A1 | 3/2007 | Cox et al. |
| 2007/0124609 A1 | 5/2007 | Lee |
| 2007/0156370 A1 | 7/2007 | White et al. |
| 2007/0174650 A1 | 7/2007 | Won et al. |
| 2007/0245161 A1 | 10/2007 | Shaw et al. |
| 2008/0005591 A1 | 1/2008 | Trautman et al. |
| 2008/0005592 A1 | 1/2008 | Allarey et al. |
| 2008/0022140 A1 | 1/2008 | Yamada et al. |
| 2008/0082844 A1 | 4/2008 | Ghiasi et al. |
| 2008/0098242 A1 | 4/2008 | Peterson |
| 2008/0162770 A1 | 7/2008 | Titiano et al. |
| 2008/0172565 A1 | 7/2008 | Chu et al. |
| 2008/0288796 A1 | 11/2008 | Nakamura et al. |
| 2009/0049315 A1 | 2/2009 | Diab et al. |
| 2009/0150696 A1 | 6/2009 | Song et al. |
| 2009/0153109 A1 | 6/2009 | Koertzen et al. |
| 2009/0164814 A1 | 6/2009 | Axford et al. |
| 2009/0187776 A1 | 7/2009 | Baba et al. |
| 2009/0199020 A1 | 8/2009 | Bose et al. |
| 2009/0230769 A1 | 9/2009 | Aerts |
| 2009/0235108 A1 | 9/2009 | Gold |
| 2009/0254909 A1 | 10/2009 | Hanson et al. |
| 2009/0259345 A1 | 10/2009 | Kato et al. |
| 2009/0271646 A1 | 10/2009 | Talwar et al. |
| 2010/0013543 A1 | 1/2010 | Kang |
| 2010/0023790 A1 | 1/2010 | Cooper et al. |
| 2010/0115293 A1 | 5/2010 | Rotem et al. |
| 2010/0115304 A1 | 5/2010 | Finkelstein et al. |
| 2010/0153763 A1 | 6/2010 | Sood |
| 2010/0162023 A1 | 6/2010 | Rotem et al. |
| 2010/0191936 A1 | 7/2010 | Khatri et al. |
| 2010/0296238 A1 | 11/2010 | Mowry et al. |
| 2010/0332856 A1 | 12/2010 | Song |
| 2011/0022833 A1 | 1/2011 | Nussbaum et al. |
| 2011/0055609 A1 | 3/2011 | Karayi et al. |
| 2011/0113273 A1 | 5/2011 | Okitsu et al. |
| 2011/0283124 A1 | 11/2011 | Branover et al. |
| 2012/0066535 A1 | 3/2012 | Naffziger |
| 2012/0079290 A1 * | 3/2012 | Kumar et al. ................ 713/300 |

OTHER PUBLICATIONS

"Advanced Configuration and Power Interface Specification"; Hewlett-Packard Corporation, Intel Corporation, Microsoft Corporation, Phoenix Technologies LTD., Toshiba Corporation, Oct. 10, 2006; pp. 1-297.

"Advanced Configuration and Power Interface Specification"; Hewlett-Packard Corporation, Intel Corporation, Microsoft Corporation, Phoenix Technologies LTD., Toshiba Corporation, Oct. 10, 2006; pp. 298-631.

White paper: "Advanced Configuration and Power Interface Specification", Hewlett-Packard Inc; Jun. 16, 2009 pp. 19-23.

Isci et al.; "Live, Runtime Phase Monitoring and Prediction on Real Systems with Application to Dynamic Power Management" 2006, pp. 1-12, Micro 39 Proceedings of the 39th Annual IEEE/ACM International Symposium on Microarchitecture.

Govil et al.; "Comparing Algorithms for Dynamic Speed-Setting of a Low-Power CPU", Proceedings of the Annual International Conference on Mobile Computing and Networking; Mobicom; Nov. 13, 1995; pp. 13-25.

International Search Report in related Application No. PCT/US2011/043978, Oct. 7, 2011, pp. 1-10.

(56) References Cited

OTHER PUBLICATIONS

Fischer et al.; "A 90nm Variable-Frequency Clock System for a Power-Managed Itanium-Family Processor;" 2005 IEEE International Solid State Circuits Conference (ISSCC), Feb. 8, 2005; pp. 1-3.

Goel et al.; "Low-Overhead Design of Soft-Error-Tolerant Scan Flip-Flops with Enhanced-Scan Capability;" Proceedings of the 2006 Conference on Asia South Pacific Design Automation: ASP-DAC 2006, Yokohama, Japan, Jan. 24-27, 2006; pp. 665-670.

Krishnamohan, Srivathsan; Mahapatra, Nihar R.; "A Highly-Efficient Technique for Reducing Soft Errors in Static CMOS Circuits;" Proceedings of the IEEE International Conference on Computer Design (ICCD '04), Oct. 11-13, 2004; pp. 1-6.

Karnik et al.; "Scaling trends of Cosmic Rays induced Soft Errors in static latches beyond 0.18u;" 2001 Symposium on VLSI Circuits Digest of Technical Papers, Jan. 2001; pp. 61-62.

Tanenbaum, Andrew S.; "Structured Computer Organization (Third Edition);" Section 1.4 Hardware, Software, and Multilevel Machines, Prentice Hall, New Jersey, 1990, ISBN: 0-13-854662-2; cover pages 1-2 and pp. 11-13.

Ware et al.; "Architecting for Power Management: The IBM POWER7 Approach"; 2010 IEEE 16th International Symposium on High Performance Computer Architecture (HPCA); Jan. 9, 2010; Piscataway, NJ, USA pp. 1-11.

\* cited by examiner

METHOD FOR SOC PERFORMANCE AND POWER OPTIMIZATION

PRIORITY INFORMATION

This application claims priority to U.S. Provisional Patent Application Ser. No. 61/570,089 entitled "Method For SOC Performance and Power Optimization", filed Dec. 13, 2011, the entirety of which is incorporated herein by reference.

BACKGROUND

1. Field of the Invention

This invention relates to computing systems, and more particularly, to efficient management of resources within a semiconductor chip for an optimal combination of power reduction and high performance.

2. Description of the Relevant Art

The power consumption of modern integrated circuits (IC's) has become an increasing design issue with each generation of semiconductor chips. As power consumption increases, more costly cooling systems such as larger fans and heat sinks must be utilized in order to remove excess heat and prevent IC failure. However, cooling systems increase system costs. The IC power dissipation constraint is not only an issue for portable computers and mobile communication devices, but also for high-performance microprocessors, which may include multiple processor cores and multiple pipelines within a core.

A system-on-a-chip (SOC) integrates multiple functions into a single integrated chip substrate. The functions may include digital, analog, mixed-signal and radio-frequency (RF) functions. Typical applications are used in the area of embedded systems. Energy-constrained cellular phones, portable communication devices and entertainment audio/video (A/V) devices are some examples of systems using an SOC. An SOC may use powerful processors, whereby power consumption may significantly rise if not managed. The on-die processors may include general-purpose processors, graphics processors, application specific integrated circuits (ASICs), field programmable gate arrays (FPGAs), and so forth.

The on-die interaction of different processors and computational blocks within an integrated circuit such as an SOC may be complex and lead to inefficient communication and resource management. Power management and performance may each degrade due to these inefficiencies. In some cases, software control may be used for management of on-die resources. For example, an operating system (OS), user software, or otherwise may be used. However, software includes an inherent delay, such as tens of milliseconds, when adjusting operating modes and states of on-die resources.

In addition, software control typically focuses on individual processors, rather than the SOC in its entirety. The software control also tends to be high-level and doesn't consider low-level specifics of workloads related to a particular processor type let alone the relationships these low-level specifics have with on-die processors of different types. In one example, an OS selection policy for a power-performance state (P-state) for a given processor is based on a utilization factor. A higher utilization causes the OS policy to select a higher P-state. However, memory bounded workloads can be executed for a longer time thus creating higher utilization. Yet executing these types of workloads at a high P-state is an inefficient operation with lower performance/watt.

In view of the above, efficient methods and systems for efficient management of resources within a semiconductor chip for an improved combination of power reduction and high performance are desired.

SUMMARY OF EMBODIMENTS

Systems and methods for efficient management of resources within an integrated circuit for an optimal combination of power reduction and high performance are contemplated.

In one embodiment, an integrated circuit such as a system-on-a-chip (SOC) includes at least two processing units. Each processing unit includes at least one processor core and one cache. In one embodiment, a first processing unit is a general-purpose central processing unit (CPU) and a second processing unit is a graphics processing unit (GPU). However, in other embodiments, the processing units may be otherwise. The SOC includes a power management unit (PMU) that determines whether a first activity level for the first processing unit is above a first threshold and a second activity level for the second processing unit is below a second threshold. If this condition is true, then the workload on the SOC is focused on the first processing unit.

In response to the above determination, the PMU places a limit on a highest power-performance state (P-state) used by the second processing unit. Additionally, the PMU may send an indication to flush the at least one cache within the second processing unit. Further, the PMU changes a P-state used by the first processing unit to a higher performance P-state. A sum of power consumed by the first processing unit at the higher performance P-state and the second processing unit at a P-state is below a thermal design power (TDP) of the SOC.

These and other embodiments will be further appreciated upon reference to the following description and drawings.

Figure 1:
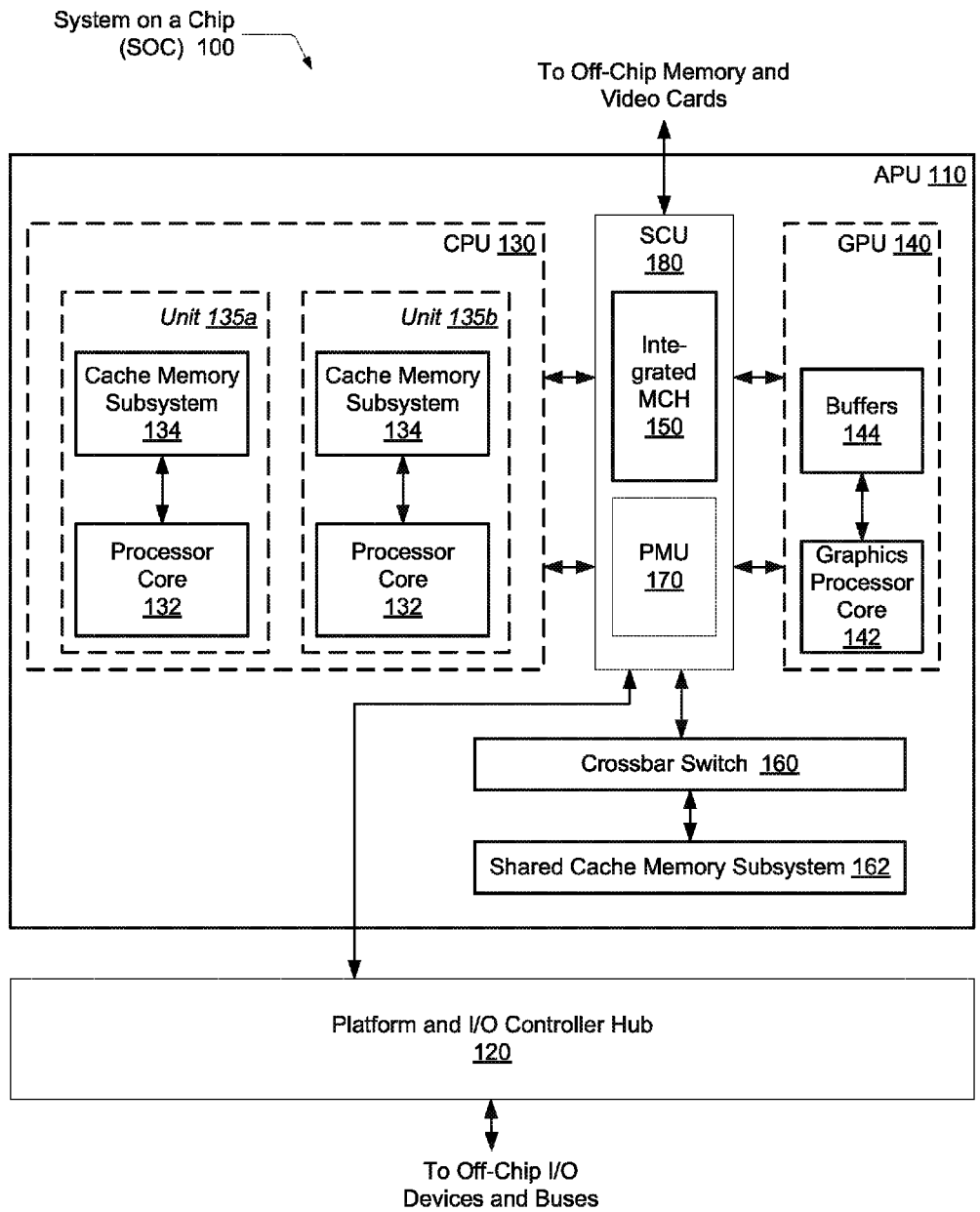
FIG. 1 a generalized block diagram of one embodiment of a system-on-a-chip (SOC).

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Turning to FIG. 1, a generalized block diagram of one embodiment of a system-on-a-chip (SOC) 100 is shown. The SOC 100 is an integrated circuit (IC) that includes multiple types of IC designs on a single semiconductor die, wherein each IC design provides a separate functionality. Traditionally, each one of the types of IC designs may have been manufactured on a separate silicon wafer. In the illustrated embodiment, the SOC 100 includes both an accelerated processing unit (APU) 110 and a platform and input/output (I/O) controller hub 120 on a single semiconductor die.

In one embodiment, the APU 110 may include a general-purpose central processing unit (CPU) 130 and a graphics processing unit (GPU) 140 on a same semiconductor die. In one embodiment, the CPU 130 and the GPU 140 may be proprietary cores from different design centers. Other various processors may be placed in the SOC 100 in addition to or in place of the CPU 130 and the GPU 140. Other examples of on-die processors the SOC 100 may use include at least digital signal processing (DSP) cores, field programmable gate arrays (FPGAs), application specific integrated circuits (ASICs), and so forth.

The APU 110 may utilize a system controller unit (SCU) 180 for controlling the operation of the resources on the SOC 100 and synchronizing communication among the resources. The SCU 180 may manage power-up sequencing of the various processors on the SOC 100 and control multiple off-chip devices via reset, enable and other signals conveyed through ports in the PICH 120. The SCU 180 may also manage communication between the various processors on the multiple buses within the SOC 100. The SOC 100 may include one or more clock sources, such as phase lock loops (PLLs), which are not shown for ease of illustration. The clock sources may provide clock signals for each of the components within the SOC 100. The SCU 180 may control these clock sources.

The SCU 180 may include an integrated memory controller hub (IMCH) 150 to directly communicate with off-chip memory and video cards. The off-chip memory may include at least dynamic random access memory (DRAM). The DRAM may be located on dual in-line memory modules (DIMMs) on a motherboard or a separate card on the motherboard. In addition, the IMCH 150 may be connected to off-chip disk memory through an external memory bus. In one embodiment, the SCU 180 may include integrated channel circuitry to directly link signals from the platform and input/output (I/O) controller hub 120 to the CPU 130 and the GPU 140 for data control and access. The SCU 180 may utilize firmware and other microcode for coordinating signal and bus control.

The platform and I/O controller hub (PICH) 120 may interface with different I/O buses according to given protocols. The PICH 120 may perform I/O functions and communicate with devices and software such as peripherals following the Universal Serial Bus (USB) protocol, peripherals and network cards following the Peripheral Component Interconnect Express (PCIe) protocol, the system basic input/output software (BIOS) stored in a read only memory (ROM), interrupt controllers, Serial Advanced Technology Attachment (SATA) devices, network interfaces, a multi-channel high definition audio codec functionality and interface and so forth. The PICH 120 may respond to control packets and messages received on respective links and generate control packets and response packets in response to information and commands received from the APU 110. The PICH 120 may perform on-die the operations typically performed off-die by a conventional Southbridge chipset.

In one embodiment, the SCU 180 may include a power management unit (PMU) 170. The PMU 170 may include power management policies for the various processors and other functional blocks, such as the PICH 120, on the SOC 100. One or more of the processors and other functional blocks may include internal power management techniques. The PMU 170 may receive measured power consumption values from each of the CPU 130, the GPU 140 and the PICH 120. The PMU 170 may sum the measured values and compare the result to a threshold, such as a thermal design power (TDP). The TDP is the amount of power that a cooling system for the SOC 100 can dissipate.

The hardware within the PMU 170 may communicate with each of the CPU 130, the GPU 140 and the PICH 120 to adjust their respective operating modes based on at least the comparison with the TDP. In addition, hardware control circuitry within the PMU 170 and/or the SCU 180 may identify workloads specific more toward a given one of the processors, such as the CPU 130 or the GPU 140. For example, a workload may be CPU-focused, GPU-focused or combined. The SCU 180 may receive or compute activity levels for at least each of the CPU 130, the GPU 140 and the PICH 120. The activity levels may be used to determine a current type of workload being executed on the SOC 100 and accordingly, a type of optimization actions to perform for an optimal combination of power and performance in the SOC 100.

The control circuitry may perform optimization actions based on the specifics of the workload. The optimization actions may include flushing particular caches on the SOC 100, enabling or disabling one or more cores within each of the CPU 130 and the GPU 140, and adjusting a power-performance state (P-state) within one or more of the CPU 130 and the GPU 140. Other actions may be taken. Further details are provided later. However, first, a further description of the components of the SOC 100 is given below.

The CPU 130 may include one or more processing units 135a-135b, which may include a processor core 132 and a corresponding cache memory subsystem 134. In some embodiments, the CPU 130 may also include a shared cache memory subsystem (not shown) that is accessed by each one of the processing units 135a-135b.

Each processor core 132 may include circuitry for executing instructions according to a given instruction set. For example, the SPARC® instruction set architecture (ISA) may be selected. Alternatively, the x86, x86-64®, Alpha®, PowerPC®, MIPS®, PA-RISC®, or any other instruction set architecture may be selected. Generally, the processor core 132 accesses the cache memory subsystems 134, respectively, for data and instructions. If the requested block is not found in cache memory subsystem 134 or in any shared cache memory subsystem within the CPU 130, then a read request may be generated and transmitted to the integrated MCH 150. The integrated MCH 150 may perform address translations and queue the request before sending it to off-chip memory through a respective memory bus.

Continuing with the components of the SOC 100, cache subsystems 134 may comprise high-speed cache memories configured to store blocks of data. Cache memory subsystems 134 may be integrated within a respective processor core 132. Alternatively, cache memory subsystems 134 may be connected to a processor core 132 in a backside cache configuration or an inline configuration, as desired. Still further, cache memory subsystems 134 may be implemented as a hierarchy of caches. Caches that are located nearer processor cores 132 (within the hierarchy) may be integrated into a processor core 132, if desired.

In one embodiment, cache memory subsystems 134 each represent L2 cache structures, and shared cache subsystem 162 represents an L3 cache structure. Both the cache memory subsystem 134 and the shared cache memory subsystem 162 may include a cache memory coupled to a corresponding cache controller. In one embodiment, each processor core 132 and each graphics processor core 142 may share storage space and data within the shared cache memory subsystem 162 through the crossbar switch 160. The crossbar switch 162 and each of the cache controllers may maintain a cache coherence protocol.

The GPU 140 may be able to both directly access both local memories 134 and 162 and off-chip memory via the integrated MCH 150. This embodiment may lower latency for memory accesses for the GPU 140, which may translate into higher performance. Since cores within each of the CPU 130 and the GPU 140 may access a same memory, the SCU 180 may maintain cache coherency for the CPU 130 and the GPU 140. In addition, the PMU 170 within the SCU 180 may allocate TDP budgets between the CPU 130 and the GPU 140.

The integrated MCH 150 may follow memory channel protocols for off-chip memory, such as DRAM stored in DIMMS. The protocol may determine values used for information transfer, such as a number of data transfers per clock cycle, signal voltage levels, signal timings, signal and clock phases and clock frequencies. Protocol examples include DDR2 SDRAM, DDR3 SDRAM, GDDR4 (Graphics Double Data Rate, version 4) SDRAM, and GDDR5 (Graphics Double Data Rate, version 5) SDRAM.

In one embodiment, the GPU 140 may include one or more graphic processor cores 142 and data storage buffers 144. A GPU may be a dedicated graphics-rendering device for a personal computer, a workstation, or a video game console. The graphic processor core may perform data-centric operations for at least graphics rendering and three dimensional (3D) graphics applications. The graphics processor core 142 may have a highly parallel structure making it more effective than the general-purpose CPU 130 for a range of complex algorithms. The graphics processor core 142 may include multiple parallel data paths. Each of the multiple data paths may include multiple pipeline stages, wherein each stage has multiple arithmetic logic unit (ALU) components and operates on a single instruction for multiple data values in a data stream.

The graphics processor core 142 may generally execute the same programs, such as vertex shaders or pixel shaders, on large numbers of objects (vertices or pixels). Since each object is processed independently of other objects, but the same sequence of operations is used, a single-instruction-multiple-data (SIMD) parallel datapath may provide a considerable performance enhancement. The graphics processor core 142 may provide or be connected to a video decoding unit to allow video decoding to be hardware accelerated.

Figure 2:
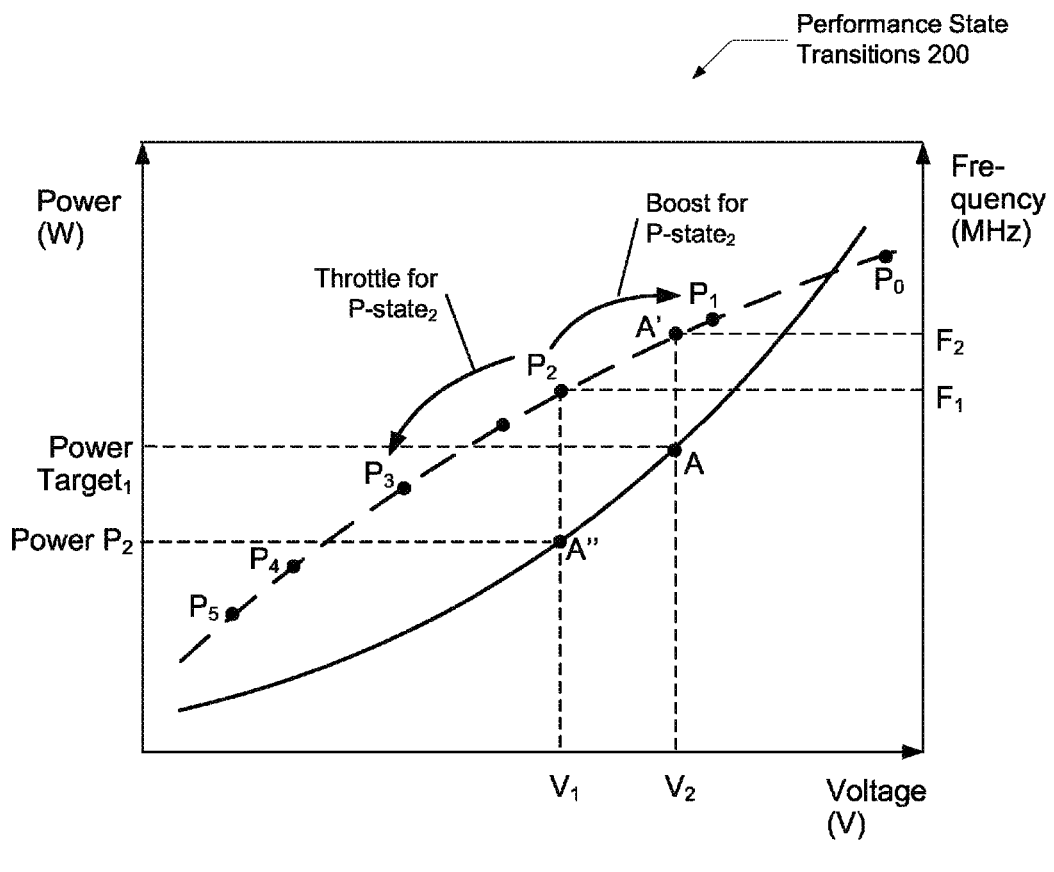
FIG. 2 is a generalized block diagram of one embodiment of power-performance state transitions for processors on the SOC.

Turning now to FIG. 2, one embodiment of power-performance state transitions 200 for processors on the SOC 100 is shown. Two curves are shown in the diagram showing non-linear (e.g., cubic or quadratic) relationships between power versus voltage and frequency versus voltage. Six discrete power-performance states (P-states) are shown in the diagram denoted as $P_0$ to $P_5$. A small number of discrete P-states are shown to simplify the diagram. Although only six discrete P-states are shown, another number of discrete P-states may be supported.

In the diagram shown, the P-state $P_5$ may correspond to a discrete state with a lowest performance of all the supported discrete states and comprises the lowest operational frequency. On the other hand, the P-state $P_0$ may correspond to a discrete state with a highest performance of all the supported discrete states and comprises the highest operational frequency. In addition, the P-state $P_0$ may correspond to a discrete state with a highest power consumption of all the supported discrete states and comprises the highest operational voltage. Typically, the endpoint discrete states represented by P-states $P_0$ and $P_5$ define a region of predictable performance. Therefore, configuring a processor to support multiple P-states, or operating points, along the non-linear frequency versus voltage curve may provide stable, optimal utilization of power and delivery of performance for the semiconductor chip, such as a processor.

As shown in the diagram, a power target$_1$ may be chosen for the processor, wherein the power target$_1$ represents an initial value for a thermal design power (TDP) of the processor. A thermal design power (TDP) may represent an amount of power that a cooling system is able to dissipate without exceeding the maximum junction temperature for transistors within the processor. As shown in FIG. 2, the power target$_1$ corresponds to a data point A on the power versus voltage non-linear curve. Data point A corresponds to an operating voltage $V_2$. Projecting data point A onto the non-linear frequency versus voltage curve with respect to the operating voltage $V_2$ provides data point A'. The data point A' corresponds to an operating frequency $F_2$. The operating point represented by the combination of the operating voltage $V_2$ and the operating frequency $F_2$ may provide an optimal utilization of power and delivery of performance for the processor.

As described above and shown in the diagram, an operating point for power target$_1$ is identified by data point A'. However, this operating point is not represented by a discrete P-state on the power versus frequency curve. The data point A' is located between the P-states $P_1$ and $P_2$. In order to reduce power consumption, the P-state $P_2$ may be chosen as an initial operating point for the corresponding processor. A corresponding combination of the operating voltage $V_1$ and the operating frequency $F_1$ may be the resulting chosen operating point. An example of supported operating points is provided in the sample P-state table 210. Pairs of operational frequencies and operational voltages for the discrete P-states $P_o$ to $P_5$ are shown. The supported P-states shown in the curves and in the table 210 may correspond to a given processor on the SOC 100. In addition, the supported P-states may correspond to other types of chips, such as a FPGA or an ASIC. Each type of processing unit on the SOC 100 may have unique corresponding supported P-states.

A given processing unit on the SOC 100 may continue processing workloads utilizing an initially assigned P-state until the workload on the SOC 100 significantly changes, an activity level for the given processing unit changes, or an activity level of another processing unit on the SOC 100 changes. In one embodiment, the PMU 170 on the SOC 100 may detect the occurrence of one of these conditions and accordingly change a P-state for one or more processing units on the SOC 100 to increase overall performance, but yet maintain a TDP limit for the entire SOC 100.

A "throttle" of a P-state includes decrementing the currently selected P-state by one P-state to a lower power consumption P-state. In contrast, a "boost" of a P-state includes incrementing the currently selected P-state by one P-state to a higher performance P-state. Throttling the P-state $P_2$ includes transitioning the currently selected P-state $P_2$ to the lower power-performance state $P_3$. A simple illustration of boosting and throttling a given P-state, such as the P-state $P_2$ as an example, is shown in FIG. 2. In some embodiments, each boost operation and each throttle operation may cause a currently selected P-state to transition by two or more P-states when the logic supports this added complexity.

Continuing with the transitions of P-states, after receiving activity level estimates from the processing units, the PMU 170 may convey parameters, such as a new P-state, to the processing units on the SOC 100. In addition, the PMU 170 may indicate one or more relatively inactive processing units flush their caches. Additional embodiments may also include powering down some portion (or all) of a cache within a processing unit. Further, the PMU 170 may reduce the width and the request rate of the relatively inactive processing unit to the memory. The PMU 170 may gate one or more clocks and the power of components on a path between the relatively inactive processing unit and memory. In various embodiments, flushing of caches and adjusting memory bandwidth may be selectively enabled or disabled so that they are permitted or not permitted to occur.

Control logic within either the PMU 170 or the SCU 180 may maintain a TDP budget across the multiple processing units on the SOC 100. A processing unit that is relatively inactive may be allotted fewer power credits than its current value of allotted credits. Essentially, the relatively inactive computation unit is donating power credits. Conversely, a processing unit that is highly active may be allotted more power credits than its current value of allotted credits. Essentially, the highly active computation unit is receiving the donated power credits. As used herein, the term "power credits" may also be referred to as "thermal credits".

After the PMU 170 redistributes power credits among the multiple processing units on the SOC 100 based on received activity level estimates, each of the processing units may accordingly select a new corresponding P-state. In one embodiment, the selection may include choosing any one of a given number of supported discrete P-states. In another embodiment, the selection may include determining whether to boost, throttle or maintain a currently selected P-state.

Figure 3:
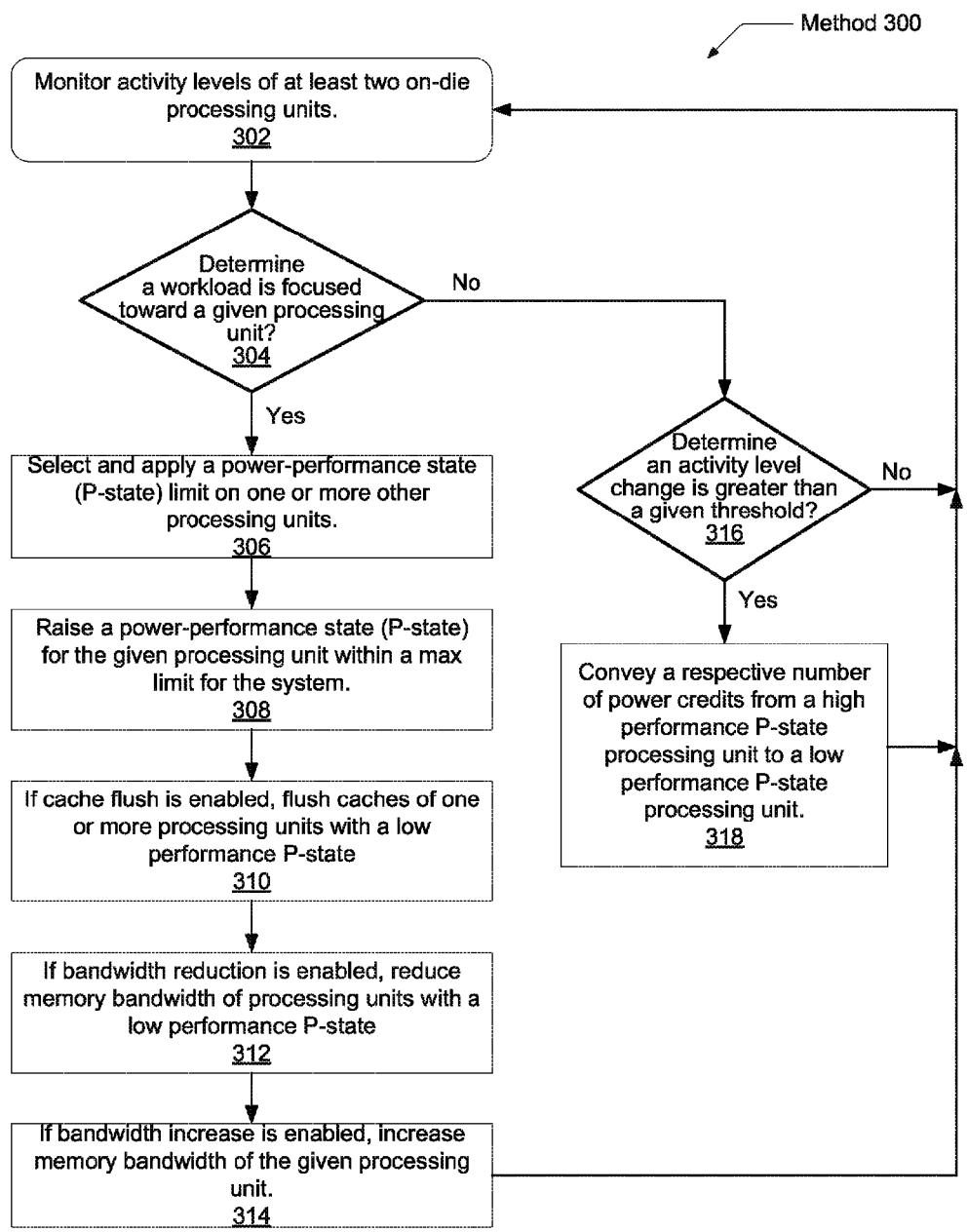
FIG. 3 is a generalized flow diagram of one embodiment of a method for efficient power and performance management on a die with multiple processing units.

Turning now to FIG. 3, one embodiment of a method 300 for efficient power and performance management on a die with multiple processing units is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 302, one or more software applications are being executed on the SOC 100. The SOC 100 may include an accelerated processing unit (APU) 110 with multiple processing units on a same semiconductor die. Examples of processing units include a general-purpose central processing unit (CPU), a graphics processing unit (GPU), digital signal processing (DSP) cores, field programmable gate arrays (FPGAs), application specific integrated circuits (ASICs), and so forth. In one embodiment, the SCU 180 monitors one or more of an activity level, an amount of current drawn, an amount of switching capacitance, and so forth for each of the processing units.

In one embodiment, the SCU 180 includes a microcontroller that polls each processing unit at the end of a given time interval for a measurement indicating a corresponding activity level. In other embodiments, physical wires are routed between the SCU 180 and particular portions of a processing unit. In one example, an updated status of an instruction retirement pointer may indicate an activity level during a given time interval for a general-purpose CPU. In another example, a high utilization of components within a GPU, such as a number of computation units (CUs) and a number of parallel pipe stages, may indicate an activity level for the GPU. Alternatively, estimations for a switching capacitance or an amount of drawn current may be sent from the processing units to the SCU 180.

In one embodiment, the SMU 180 may compare activity level estimations from the processing units to stored values. The comparison results may determine whether a given processing unit has a high, low or moderate activity level according to given thresholds. In addition, the comparison results may indicate which processing units are more highly utilized than others. A current workload being executed on the SOC 100 may be more focused toward a given processing unit. This condition may be determined from the received activity level estimates and the performed comparisons. In addition, the operating system (OS) may have a P-state selection policy based on analysis of code and upcoming resource utilization. This policy may request a given one of the processing units operates with a high performance P-state. For example, the OS P-state selection policy may request the CPU 130 operate with the $P_0$ P-state.

In one example, a GPU may indicate to the SCU 180 a high number of CUs executing and a high utilization of a graphics engine over a given time interval while the GPU operates at a high GPU P-state. In addition, a CPU may indicate to the SCU 180 a low activity of its instruction retirement pointer over a given time interval while the CPU operates at a low CPU P-state. In such a case, the workload being executed on the SOC 100 may be determined to be a GPU-focused workload. In another example, a CPU may indicate to the SCU 180 a high activity of its instruction retirement pointer over a given time interval while the CPU operates at a moderate to a high CPU P-state. Alternatively, the CPU may indicate to the SCU 180 a relatively high switching capacitance over the given interval. In addition, a GPU may indicate to the SCU 180 a low number of CUs executing and a low utilization of a graphics engine over a given time interval while the GPU operates at a low GPU P-state. In such a case, the workload being executed on the SOC 100 may be determined to be a CPU-focused workload.

If it is determined a workload is focused toward a given processing unit (conditional block 304), whether by analysis of activity level estimates or by requests from an OS P-state selection policy, then in block 306, a power-performance state (P-state) limit may be selected and applied to other processing units. In one embodiment, the P-state limit is a configurable parameter. In one embodiment, a processing unit other than the given processing unit may not be permitted to operate at a P-state higher in performance than the corresponding P-state limit. Limiting the performance and power consumption of the other processing units allows, in block 308, the given processing unit with the focused workload to operate at a higher performance P-state. However, a system power budget, such as a system TDP limit, is not exceeded since CPU power consumption has been capped by applying the P-state limit.

In one embodiment, an energy margin accumulator may track the reallocation of power credits between two or more processing units, such as the CPU 130 and the GPU 140. In one embodiment, wherein the SOC 100 includes the CPU 130 and the GPU 140 as processing units, the energy margin may be calculated at the end of each given time interval as Energy Margin (i)=Energy Margin (i−1)+(ChipTDPLimit−CPU Power (i)−GPU Power (i)−borrowed credits), wherein the index "i" may mark a point-in-time. Here, the variable Energy Margin is a signed accumulative value. The variable ChipT- DPLimit is the assigned thermal design power, or an equivalent number of power credits, for the SOC 100.

Continuing with the calculation for the energy margin, each of the variables CPU Power and GPU Power may be a power consumption estimate for a corresponding processing unit. This value may be based on an activity level estimate as described earlier and converted to power credits or a power estimate value. Alternatively, this value is an electrical measurement such as an amount of current drawn or an amount of switching capacitance. Again, this value may be converted to power credits or a power estimate value.

The variable "borrowed credits" may be an actual amount of power credits borrowed by the given processing unit identified in conditional block 304. An available total amount of power credits to borrow may be found after each of the other processing units has a corresponding P-state limit applied as described above for block 306 of method 300. After the corresponding P-state limits are applied to the other processing units, the energy margin calculation with the "borrowed credits" currently set at zero may yield a positive value. If the energy margin calculation yields a positive value, then there are available power credits to donate to the identified given processing unit. Therefore, the given processing unit has an amount of power credits to borrow to use to boost its performance. As described earlier, each of the CPU power and the GPU power may be estimated at the end of each given time interval. Additionally, at the end of each longer second time interval, the energy margin value may be adjusted by a coefficient. In one embodiment, the coefficient is less than one, such as one half. The adjustment by the coefficient may account for the accumulated energy dissipates over time. Therefore, the relevancy of the accumulated energy is reduced over time.

In block 310, caches associated with other processor units may be flushed. These caches may store data that may be shared by the given processing unit. As a result of these caches being flushed, during the execution of applications on the given processing unit, the SCU 180 does not send probes to the corresponding other processing units. The SCU 180 and the given processing unit do not wait for probe responses while servicing memory accesses for the given processing unit. With the other processing units operating in a low performance P-state, any probe response latency may be appreciable. In some embodiments, one or more low performance P-states for one or more of the other processing units may include a cache flush as part of its transition. Therefore, these P-states may be selected when it is determined the workload is focused on the given processing unit. In one example, one of the other processing units may be a CPU. A longer memory latency for the CPU operating in a low performance P-state may not appreciably affect its performance, since the CPU has a low number of committed instructions per a given time interval.

In block 312, the memory bandwidth of the other processing units with a low performance P-state and that share memory with the given processing unit may be reduced. For example, the width of memory requests and the rate of memory requests may be both reduced. In addition, particular components between these other processing units and the memory may be clock gates and/or power gated. In block 314, the memory bandwidth of the given processing unit may be increased. For example, the rate of memory requests may be increased. In addition, if multiple queues and/or buses are available for multiple processing units, a highest priority for each of these resources may be assigned to the given processing unit.

When a workload is determined to be focused on a given processing unit, other qualifications may be used to determine whether the steps in blocks 310-314 are performed. The other qualifications may be a time duration for the focused workload, a number of decoded particular instructions, increased traffic on a particular bus, and so forth. For example, when a workload is focused toward a GPU, at times, the activity level of the CPU may increase. This increased activity level may be indicated by a high activity of its instruction retirement pointer over a given time interval. The CPU may prepare tasks for the GPU, which causes a short burst of higher activity for the CPU. The CPU may fill a command queue with multiple frames, wait for the GPU to complete processing of the multiple frames, and fill the command queue again with more frames. During this short burst of activity, a P-state limit for the CPU may be removed allowing the CPU to operate at a higher performance P-state. However, first, a P-state limit may be applied to the GPU in order that the system TDP limit is not exceeded. Whether memory bandwidth is prioritized for the CPU during this short burst may depend on a latency to switch priority back and forth. In addition, the caches of the GPU may not be flushed during this short burst, since the GPU is going to process more frames shortly.

Returning to whether a currently executing workload is focused toward a given processing unit, the received activity level estimates may not indicate the workload is focused on any one of the on-die processing units. If it is determined a workload is not focused toward a given processing unit (conditional block 304), and it is determined an activity level change is greater than a given threshold (conditional block 316), then in block 318, a respective number of power credits may be sent from a high performance P-state processing unit to a low performance P-state processing unit. For example, the P-state boost and throttle transitions for corresponding processing units may be smaller than the transitions performed in blocks 306-308.

Figure 4:
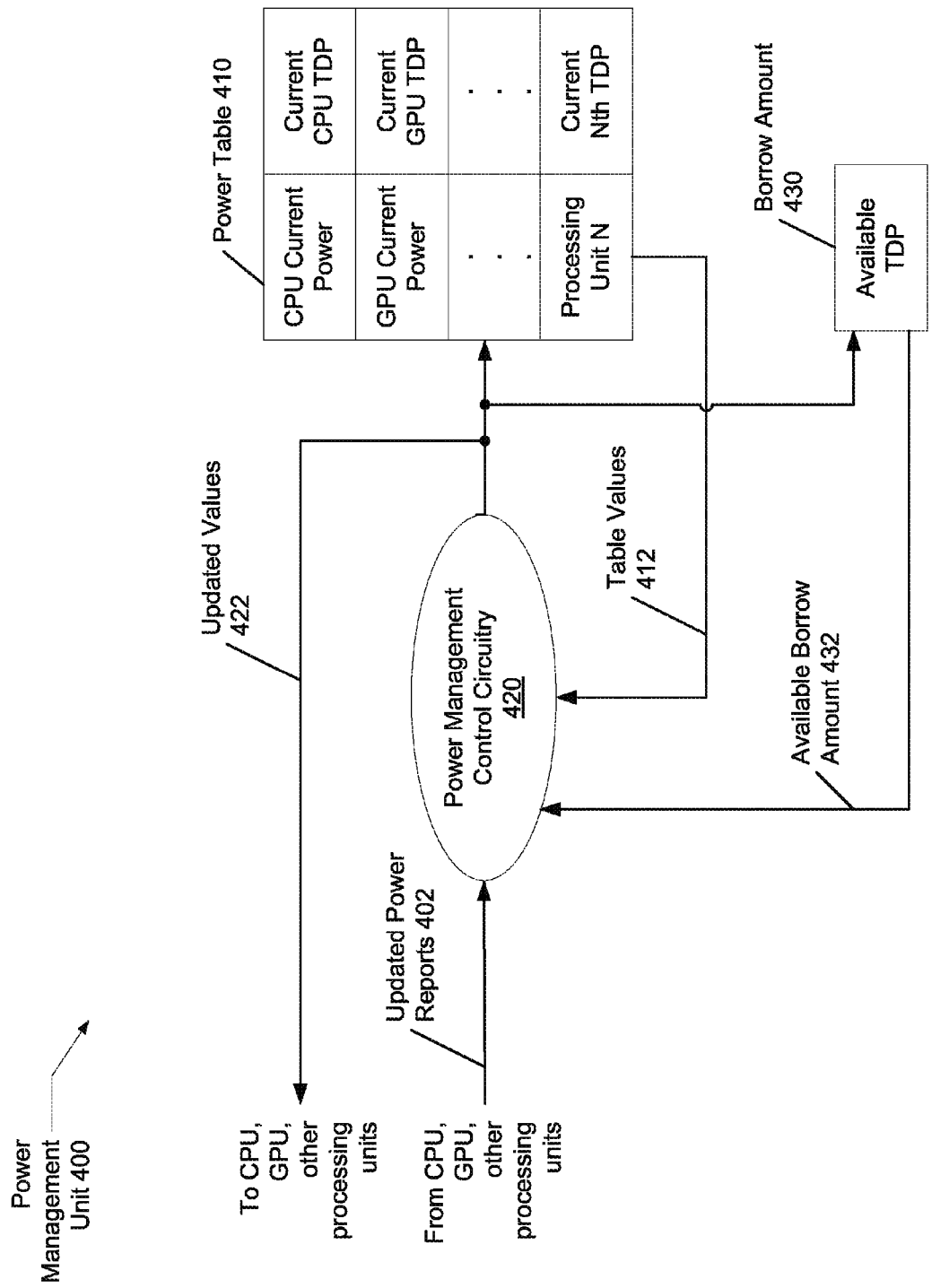
FIG. 4 is a generalized block diagram of one embodiment of a power management unit.

Turning now to FIG. 4, a generalized block diagram of one embodiment a power management unit 400 is shown. The power management unit 400 may directly communicate with one or more components in the APU 110. For example, the CPU 130, the GPU 140, and any other available processing unit may communicate with the power management unit 400. In one embodiment, the power management unit (PMU) 400 includes a power table 410. The power table 410 may include a separate entry for each of the units within the APU 110. In some embodiments wherein the APU 110 includes other types of processing units, such as a FPGA, an ASIC, and so forth, other units may be listed in the power table 410.

In one embodiment, each entry within the power table 410 may include several fields. An identifier (ID) field may identify which of the units or groups on the die of the SOC 100 corresponds to a particular entry. In other embodiments, a given entry position within the power table 410 may be assigned to a given unit and an ID is not used. Each entry of the power table 410 may store a current power consumed value for a corresponding unit. This value may be included in the updated power reports 402 from each of the CPU 130, the GPU 140 and so forth. In addition, each entry of the power table 410 may store a current TDP value assigned to a corresponding unit. This TDP value may be set to an initial TDP value, which is later updated based on the current power consumed values. A difference between a total TDP for the APU 110 and the sum of each one of the stored TDP values in table 410 may provide the TDP value indicated by the borrow amount 430. In one embodiment, this value is stored in a register. In some embodiments, the total TDP for the APU 110 is less than a total TDP for the SOC 100 due to an assigned TDP for the PICH 120.

Again, the TDP is an amount of power that a cooling system for the SOC 100 can dissipate. To prevent failure, the SOC 100 typically operates within its TDP value. The TDP value may be divided and each portion of the total TDP value may be allocated or assigned to each of the components listed in the power table 410, such as the CPU 130, the GPU 140 and other available processing units, and the PICH 120. For example, the SOC 100 may have a TDP value of 100 watts. The APU 110 may have an initial TDP value of 75 watts and the PICH 120 may have an initial TDP value of 25 watts. The CPU 130 may have an initial TDP value of 45 watts and the GPU 140 may have an initial TDP value of 30 watts. The borrow amount 430 may have an initial value of 0 watts. Other measurement units, such as power credits, normalized units, or other may be used in place of watts.

In an example wherein the APU 110 includes the CPU 130 and the GPU 140, the power management control circuitry 420 may receive updated power reports 402 from each of the CPU 130 and the GPU at the end of every given time interval. The control circuitry 420 may receive both the updated power reports 402, the table values 412 from the power table 410 and the current available borrow amount 432 from the register 430. With these inputs, the control circuitry 420 may determine updated values 422 to use to update each of the power table 410 and the register 430. Additionally, the updated values 422 may be sent to the respective processing units. In other embodiments, the respective processing units may receive updated values from the power table 410 and the register 430, rather than from outputs of the control circuitry 420.

When new activity levels, power values, or both are reported within the updated power reports 402 to the control circuitry 420, one or more entries within the power table 410 may be updated. In addition the borrow amount 430 may be updated. For example, a given field in a given entry may store a current TDP value for the CPU 130. This stored current TDP value may differ from a corresponding initial TDP value for the CPU 130. In one embodiment, the energy margin accumulator formula described above may be used to update the values stored in each of the table 410 and the borrow amount 430.

In one example, a CPU-focused workload is detected. At a first point-in-time, the stored TDP value for the GPU 140 may be updated to 10 watts from the initial 35 watts. The stored TDP value for the borrow amount 430 may be updated to 20 watts from the initial 0 watts. The stored TDP value for the CPU 130 may remain at 45 watts. The caches for the GPU 140 may be flushed and its memory bandwidth may be reduced as described earlier. At a second point-in-time after the first point-in-time, the CPU 130 may borrow the available 20 watts indicated by the borrow amount 430. The stored TDP value for the CPU 130 may be updated to 65 watts from the initial 45 watts. The stored TDP value for the borrow amount 430 may be updated to 0 watts from 20 watts. The stored TDP value for the GPU 140 may remain at 10 watts.

Continuing with the above example, at a third point-in-time after the second point-in-time, the activity level for the GPU 140 may increase, but the workload may not become GPU-focused. The workload may remain a CPU-focused workload. Due to the increased activity level, the control circuitry 420 may determine to reduce the stored TDP value for the CPU 130 from 65 watts to 55 watts. The control circuitry 420 may update the borrow amount 430 to store a TDP value of 10 watts.

At a fourth point-in-time after the third point-in-time, the GPU 130 may borrow the available 10 watts indicated by the borrow amount 430. The stored TDP value for the GPU 140 may be updated to 20 watts from 10 watts. The stored TDP value for the borrow amount 430 may be updated to 0 watts from 10 watts. The stored TDP value for the CPU 130 may remain at 55 watts. As the TDP values change for each of the CPU 130 and the GPU 140, one or more corresponding cores may be enabled or disabled and have an associated P-state updated. The updated power reports 402 may allow monitored changes within each of the CPU 130 and the GPU 140 to be used for power management and operating mode adjustments.

In one embodiment, the updated power reports 402 include values measured in watts or normalized units converted to watts. In other embodiments, the updated power reports 402 include values remaining in normalized units. In yet other embodiments, the updated power reports 402 include measured current drawn values and operational voltages that the control circuitry 420 uses to determine power usage differences between the respective units. On-die current sensors may provide the estimates of drawn currents to the control circuitry 420 within the PMU 400.

Figure 5:
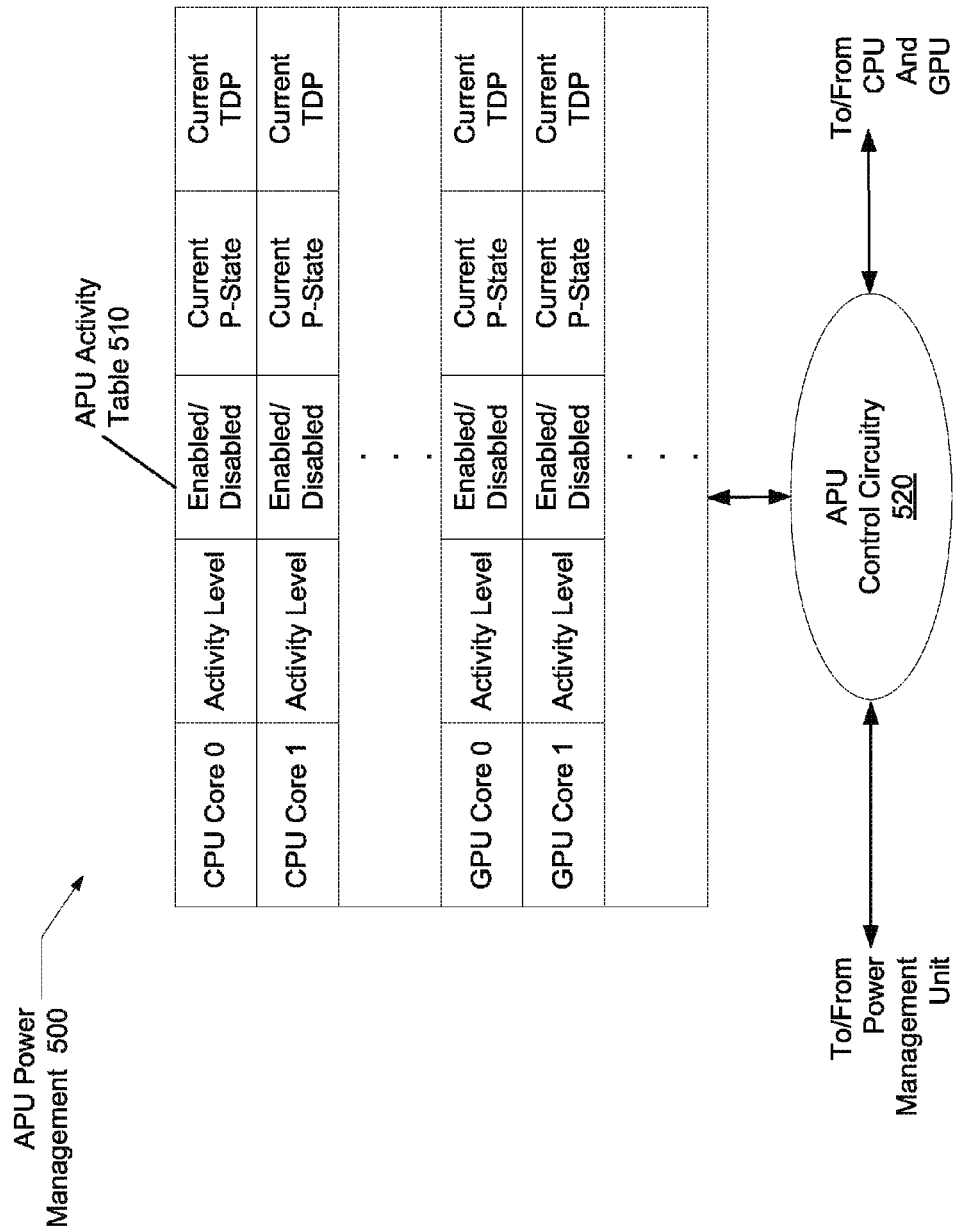
FIG. 5 is a generalized block diagram of one embodiment of an accelerated processing unit (APU) power management.

Turning now to FIG. 5, a generalized block diagram of one embodiment of an accelerated processing unit (APU) power management 500 is shown. In one embodiment, the APU power management 500 includes an APU activity table 510. The APU activity table 510 may include a separate entry for each one of the cores within the APU 110, such as the one or more processor cores within the CPU 130 and the one or more graphics processor cores within the GPU 140. In some embodiments wherein the APU 110 includes other types of units, such as a FPGA, an ASIC, or other, these units may be listed in the APU activity table 510. The control circuitry 520 may communicate with each of the PMU 170 and each one of the processing units, such as the CPU 130 and the GPU 140. In one embodiment, the table 510 and control circuitry 520 may be located in the PMU 170. In other embodiments, the table 510 and control circuitry 520 is distributed among the processing units.

Each entry within the APU activity table 510 may include several fields. Each entry within the APU activity table 510 may include an identifier (ID) field. The ID field may identify which of the cores within the CPU 130 and the GPU 140 corresponds to a particular entry. In other embodiments, a given entry position within the APU activity table 510 may be assigned to a given unit and an ID is not used.

Each entry of the APU activity table 510 may include an activity level for a corresponding core. In some embodiments, current sensors, or temperature sensors, or a summation of weighted sampled signals that provide an estimated switching capacitance may provide the activity level. In other embodiments, an updated status of an instruction retirement pointer may indicate an activity level during a given time interval for the CPU 130. For the GPU 140, a high utilization of included components, such as a number of computation units (CUs) and a number of parallel pipe stages, may indicate an activity level.

Each entry of the APU activity table 510 may include an enabled/disabled state corresponding to a given core. Additionally, each entry of the APU activity table 510 may store a current power-performance state (P-state) for a corresponding core. A given core may support a given number of discrete P-states as described earlier. Each entry of the APU activity table 510 may include a current TDP value for a corresponding core. In some embodiments, a TDP value allocated for a corresponding one of the CPU 130 or the GPU 140 may be divided and allocated across cores within the unit. In other embodiments, a TDP value is not maintained at a core level. Rather, the other values in the entries of the APU activity table 510 are used to control and manage power consumption at the core level without a core-level TDP value. The TDP value may be at the processing unit level.

In one embodiment, the APU activity table 510 may send given values, such as an activity level, a P-state, a power consumption or TDP value, and so forth to the PMU. The PMU may use this information in the updated power reports 402 described earlier. Following, the PMU may send results of power management calculations to the APU power management. The APU activity table may receive values from the PMU control circuitry and update fields and entries accordingly. For example, the PMU may determine to reduce a TDP value for the GPU 140. Therefore, one or more GPU cores may be disabled due to low activity or have a P-state adjusted to a lower power and performance state. The APU control circuitry 520 may determine what adjustments to make based on each of the stored values in the APU activity table 510, calculated values from the PMU and monitored values within each of the cores.

Figure 6:
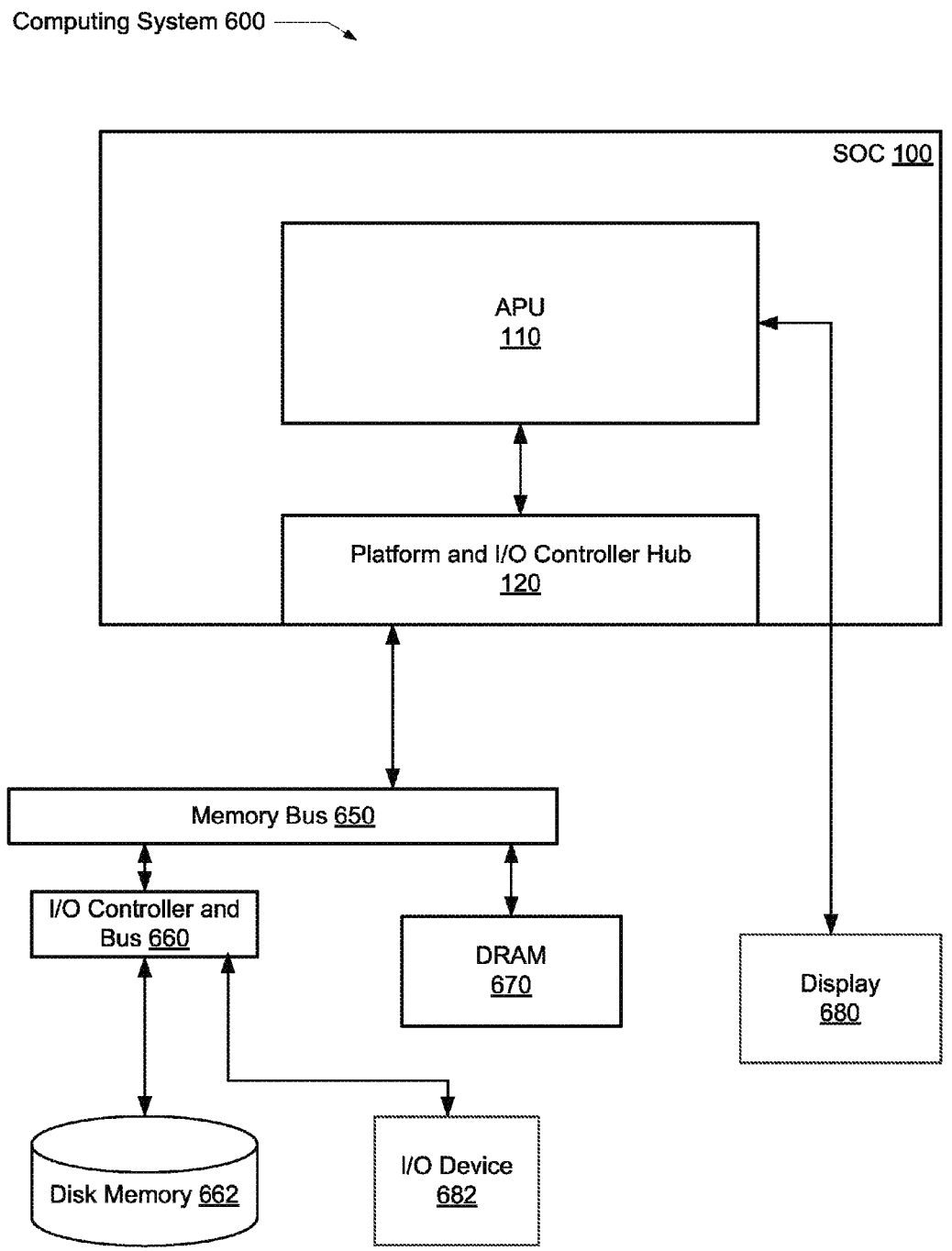
FIG. 6 is a generalized block diagram of one embodiment of computing system.

Referring to FIG. 6, a generalized block diagram of one embodiment of a computing system 600 is shown. Control logic and circuitry described above is numbered identically here. As described earlier, the SOC 100 may include an accelerated processing unit (APU) 110 and a platform and input/output (I/O) controller hub 120 on a single semiconductor die. In some embodiments, the SOC 100 may be included in a desktop or a server. In other embodiments, the SOC 100 may be included in a tablet, a laptop, a smartphone or another type of mobile device.

As shown, the SOC 100 may be connected to a display 680. Although one display is shown, it is contemplated the SOC 100 may be connected to multiple displays. In some embodiments, the SOC 100 is connected directly to the display 680. In other embodiments, the SOC 100 may be connected to the display 680 through a separate video graphics subsystem. The separate video graphics subsystem may be a video graphics card in a slot on a motherboard, which includes the SOC 100. In other embodiments, the video graphics subsystem may be a separate chip within the SOC 100. In yet other embodiments, the combination of the one or more GPUs within the APU 110 and the interface circuitry within the platform and I/O controller hub 120 may be used as a video graphics subsystem. The display 680 may include television, computer monitors, laptops, tablets, and other mobile devices.

One or more of the off-chip memories, disk memory 662 and DRAM 670 may be used to provide greater data storage for the SOC 100. Each of these memories may utilize one or more of the memory bus 650 and the I/O controller and bus 660. Additionally, the SOC 100 may also be connected to a variety of other I/O devices. As shown, the SOC 100 is connected to the general I/O device 682 via the I/O controller and bus 660. The I/O device 682 may be one of a variety of peripheral devices. The power and performance management utilized on the SOC 100 and described above may be used to provide a longer battery life for the SOC 100 and for one or more of the remaining components connected to the SOC 100 within the computing system 600. In addition, this management may be used to drive one or more displays, such as display 680, for a longer period of time while consuming a same amount of power. Further, the management may maintain the temperature of at least the SOC 100 and possibly the computing system 600 to a given low amount. This lower amount may be more tolerable or comfortable for the user and ease the capabilities of a cooling system. In yet another embodiment, the power manager within the APU 110 may be toggled on and off, and when toggled on, operate in one of the many manners described earlier.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A semiconductor chip comprising:
a first processing unit and a second processing unit; and
a power manager; and
a memory;
wherein in response to determining a first activity level for the first processing unit is above a first threshold and a second activity level for the second processing unit is below a second threshold, the power manager is configured to place a limit on a highest power-performance state (P-state) used by the second processing unit;
wherein the power manager is further configured to reduce at least one of a memory width and a memory request rate of the second processing unit to the memory.

2. The semiconductor chip as recited in claim 1, wherein the second processing unit comprises a cache, wherein the power manager is further configured to flush the cache within the second processing unit.

3. The semiconductor chip as recited in claim 1, wherein each of the first processing unit and the second processing unit is at least one of the following: a general-purpose central processing unit (CPU), a graphics processing unit (GPU), an application specific integrated circuit (ASIC), a digital signal processor (DSP), and a field programmable gate array (FPGA).

4. The semiconductor chip as recited in claim 3, wherein at least one of the first activity level and the second activity level is a status of an instruction retirement pointer measured over a time interval.

5. The semiconductor chip as recited in claim 3, wherein at least one of the first activity level and the second activity level is a number of utilized computation units in one or more pipeline stages measured over a time interval.

6. The semiconductor chip as recited in claim 1, wherein the power manager is further configured to change a P-state used by the first processing unit to a higher P-state, wherein a sum of power consumed by the first processing unit at the higher P-state and the second processing unit at a P-state not above said limit is below a thermal design power (TDP) of the semiconductor chip.

7. The semiconductor chip as recited in claim 6, wherein the power manager is further configured to:
compute an accumulated energy margin based on said sum of power and said TDP, at each of a first time interval; and
reduce the accumulated energy margin by a given amount, wherein the given amount corresponds to energy dissipating over time in the semiconductor chip, at each of a second time interval larger then the first time interval.

8. The semiconductor chip as recited in claim 7, wherein the semiconductor chip is coupled to each one of a display device and a battery, wherein the power manager is further configured to be toggled on and off, wherein in response to the power manager is toggled on, the power manager causes:
the battery has less power drawn than when the power manager is toggled off; and
the display device is driven by the semiconductor chip for a longer period of time than when the power manager is toggled off.

9. The semiconductor chip as recited in claim 7, wherein in response to determining the second activity level is above the second threshold, the power manager is further configured to:
change a P-state used by the second processing unit to a higher P-state, wherein said sum of power is below said TDP; and
allow the second processing unit to store data in the cache.

10. A method comprising:
determining a first activity level for a first processing unit of an integrated circuit (IC) is above a first threshold, and a second activity level for a second processing unit in the IC is below a second threshold; and
placing a limit on a highest power-performance state (P-state) used by the second processing unit;
wherein the IC further comprises a memory coupled to each of the first processing unit and the second processing unit and wherein the method further comprises reducing at least one of a memory width and a memory request rate of the second processing unit to the memory.

11. The method as recited in claim 10, wherein the second processing unit comprises a cache, further comprising flushing the cache within the second processing unit.

12. The method as recited in claim 10, wherein each of the first processing unit and the second processing unit is at least one of the following: a general-purpose central processing unit (CPU), a graphics processing unit (GPU), an application specific integrated circuit (ASIC), a digital signal processor (DSP), and a field programmable gate array (FPGA).

13. The method as recited in claim 12, wherein at least one of the first activity level and the second activity level is a status of an instruction retirement pointer measured over a time interval.

14. The method as recited in claim 10, further comprising changing a P-state used by the first processing unit to a higher performance P-state, wherein a sum of power consumed by the first processing unit at the higher P-state and the second processing unit at a P-state not above said limit is below a thermal design power (TDP) of the IC.

15. The method as recited in claim 14, further comprising:
computing an accumulated energy margin based on said sum of power and said TDP, at each of a first time interval; and
reducing the accumulated energy margin by a given amount, wherein the given amount corresponds to energy dissipating over time in the semiconductor chip, at each of a second time interval larger than the first time interval.

16. A power management unit (PMU) for use in an integrated circuit (IC) comprising:
an interface to each of a first processing unit and a second processing unit; and
control circuitry configured to in response to determining a first activity level for the first processing unit is above a first threshold and a second activity level for the second processing unit is below a second threshold, place a limit on a highest power-performance state (P-state) used by the second processing unit;
wherein the circuitry is further configured to reduce at least one of a memory width and a memory request rate of the second processing unit to a memory.

17. The PMU as recited in claim 16, wherein the second processing unit comprises a cache, wherein the control circuitry is further configured to flush the cache within the second processing unit.

* * * * *

UNITED STATES PATENT AND TRADEMARK OFFICE
CERTIFICATE OF CORRECTION

| | | |
|---|---|---|
| PATENT NO. | : 8,924,758 B2 | Page 1 of 1 |
| APPLICATION NO. | : 13/360012 | |
| DATED | : December 30, 2014 | |
| INVENTOR(S) | : Steinman et al. | |

It is certified that error appears in the above-identified patent and that said Letters Patent is hereby corrected as shown below:

Title page, Item (57) Abstract:

Lines 3-4, please delete "An intergrated circuit" and substitute -- An integrated circuit --.

Signed and Sealed this
Twenty-eighth Day of April, 2015

Michelle K. Lee
*Director of the United States Patent and Trademark Office*